United States Patent
Reed

(10) Patent No.: US 6,700,995 B2
(45) Date of Patent: Mar. 2, 2004

(54) APPLYING DIGITAL WATERMARKS USING DOT GAIN CORRECTION

(75) Inventor: Alastair M. Reed, Lake Oswego, OR (US)

(73) Assignee: Digimarc Corporation, Tualatin, OR (US)

( * ) Notice: Subject to any disclaimer, the term of this patent is extended or adjusted under 35 U.S.C. 154(b) by 0 days.

(21) Appl. No.: 10/209,053

(22) Filed: Jul. 30, 2002

(65) Prior Publication Data

US 2003/0079130 A1 Apr. 24, 2003

Related U.S. Application Data

(63) Continuation of application No. 09/553,084, filed on Apr. 19, 2000.

(51) Int. Cl.[7] .................................................. G06K 9/00
(52) U.S. Cl. ...................................... 382/100; 358/3.28
(58) Field of Search ................................. 382/100, 232, 382/162, 233, 239, 112, 135, 166, 167, 270, 242–250; 235/468; 383/72; 358/3.28; 380/200, 201, 204, 51; 700/37, 38; 713/176

(56) References Cited

U.S. PATENT DOCUMENTS

| | | | |
|---|---|---|---|
| 5,530,759 A | | 6/1996 | Braudaway |
| 5,544,255 A | * | 8/1996 | Smithies et al. ............. 382/119 |
| 5,568,555 A | * | 10/1996 | Shamir ........................ 380/51 |
| 5,646,997 A | | 7/1997 | Barton |
| 5,652,626 A | | 7/1997 | Kawakami |
| 5,687,236 A | | 11/1997 | Moskowitz |
| 5,721,788 A | | 2/1998 | Powell |
| 5,724,425 A | * | 3/1998 | Chang et al. .................. 705/52 |
| 5,809,139 A | | 9/1998 | Girod |
| 5,862,218 A | | 1/1999 | Steinberg |
| 5,875,249 A | | 2/1999 | Mintzer |
| 5,893,101 A | | 4/1999 | Balogh |
| 5,915,027 A | | 6/1999 | Cox |
| 5,919,730 A | | 7/1999 | Gasper et al. ............... 503/201 |

(List continued on next page.)

FOREIGN PATENT DOCUMENTS

| | | |
|---|---|---|
| EP | 1137244 | 9/2001 |
| GB | 2360659 | 9/2001 |
| WO | 99/35819 | 7/1999 |
| WO | 01/08405 | 2/2001 |
| WO | WO 01/08405 A1 | 2/2001 |

OTHER PUBLICATIONS

Ruanaidh et al. Watermarking Digital Images for Copyright Protection, IEEE Image Signal Process. vol. 143. No. 4. Aug. 1996. pp 250–256.

Fleet et al. "Embedding Invisible Information in Color Images", IEEE Int. Conf on Image Proc. Oct. 1997, vol 1 pp 532, 535.

Battiato et al. "Robust Watermarking for Images Based on Color Manipulation". Third Int. Image Hiding Workshop. 1999.

Bor et. al. "Image Watermarking Using DCT Domain Constraints", IEEE 1996, pp 231–234.

*Primary Examiner*—Jayanti K. Patel
(74) *Attorney, Agent, or Firm*—Digimarc Corporation

(57) ABSTRACT

The color values in an image data are first modified in accordance with the forward dot gain curve of an offset printing press, next the watermark "tweak" values (i.e. the watermark signal values) are calculated for this modified image data. The calculated "tweak" values are then modified in accordance with the backward dot gain values of the printing press. The modified tweak values are then added to the original image data values. The image is then printed on the offset printing press. The result is that the "effective" watermark tweak on the printed paper is not materially affected by the dot gain curve of the printing press.

15 Claims, 3 Drawing Sheets

U.S. PATENT DOCUMENTS

| | | |
|---|---|---|
| 5,930,369 A | 7/1999 | Cox |
| 5,933,798 A | 8/1999 | Linnartz |
| 5,946,414 A | 8/1999 | Cass |
| 5,949,055 A | 9/1999 | Fleet |
| 5,960,081 A | 9/1999 | Vynne |
| 5,974,548 A | 10/1999 | Adams |
| 6,104,812 A | 8/2000 | Koltai et al. .................. 380/51 |
| 6,185,312 B1 | 2/2001 | Nakamura et al. .......... 382/100 |
| 6,246,777 B1 | 6/2001 | Agarwal et al. ............ 382/100 |
| 6,304,345 B1 | 10/2001 | Patton et al. ............... 358/527 |
| 6,320,675 B1 | 11/2001 | Sakaki et al. ................ 358/1.9 |
| 6,332,031 B1 | 12/2001 | Rhoads et al. .............. 382/100 |
| 6,334,187 B1 | 12/2001 | Kadono ...................... 713/176 |
| 2001/0030759 A1 | 10/2001 | Hayashi et al. |
| 2001/0033674 A1 | 10/2001 | Chen et al. |
| 2001/0052076 A1 | 12/2001 | Kadono |
| 2002/0018879 A1 | 2/2002 | Barnhart et al. |
| 2002/0021824 A1 | 2/2002 | Reed et al. |
| 2002/0027612 A1 | 3/2002 | Brill et al. |
| 2002/0031241 A1 | 3/2002 | Kawaguchi et al. |
| 2002/0054356 A1 | 5/2002 | Kurita et al. |
| 2002/0067844 A1 | 6/2002 | Reed et al. |
| 2002/0101597 A1 | 8/2002 | Hoover |
| 2002/0105679 A1 | 8/2002 | Haynes |

* cited by examiner

Figure 1A: Forward Dot Gain Correction Curve
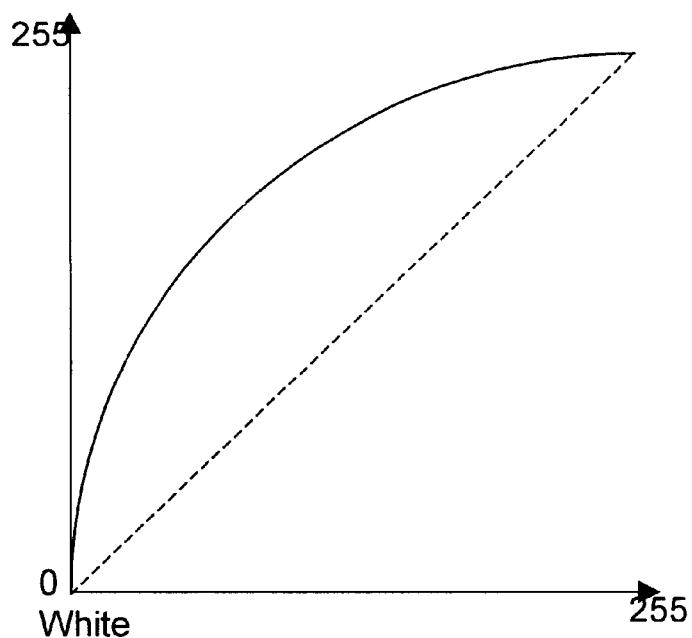
Figure 1B Backward Dot Gain Correction Curve
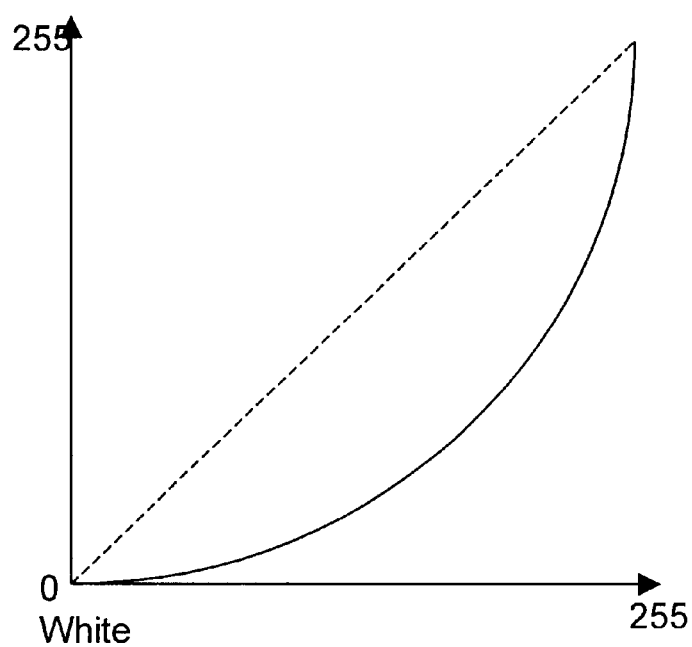

Figure 2: Present Scaling Towards Black
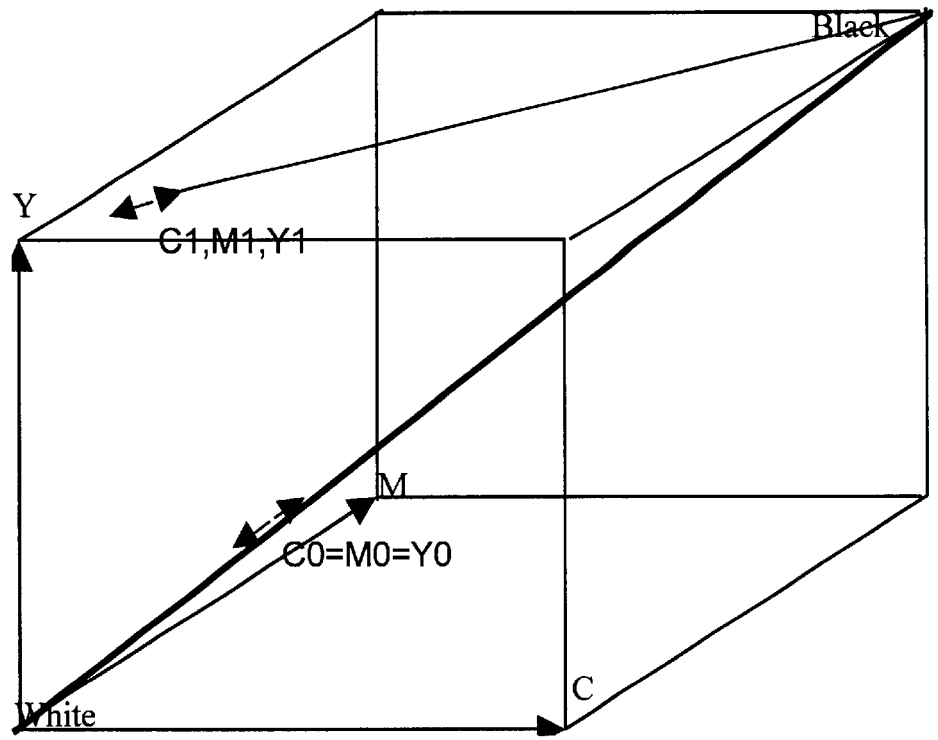
Figure 3: Scaling Towards White
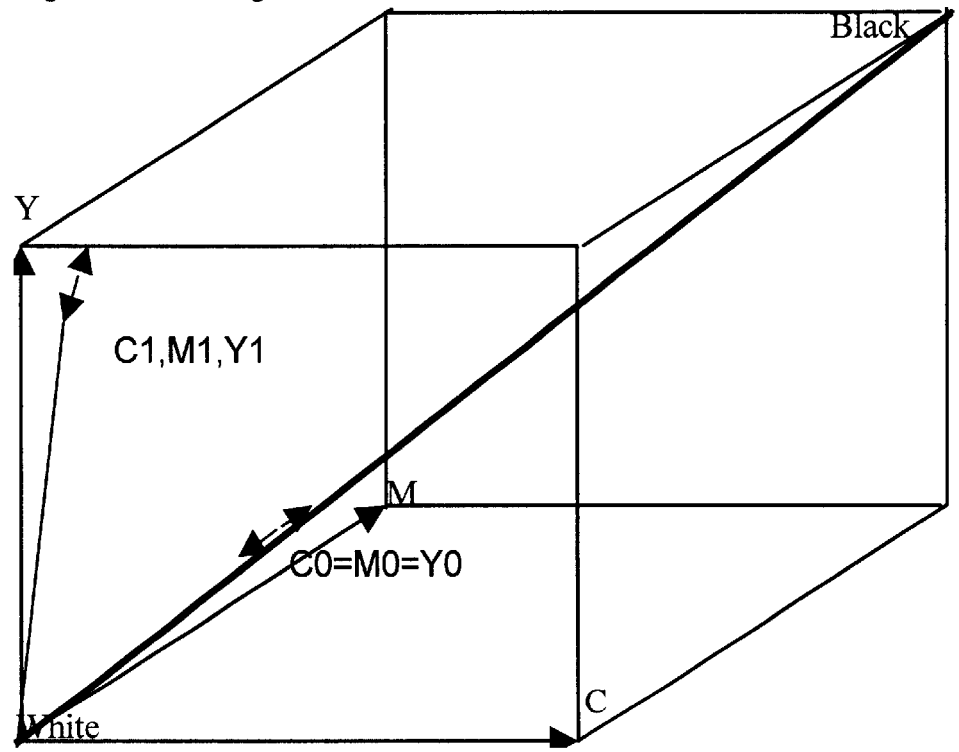

APPLYING DIGITAL WATERMARKS USING DOT GAIN CORRECTION

RELATED APPLICATIONS

This application is a continuation in part of U.S. patent application Ser. No. 09/553,084, filed Apr. 19, 2000.

FIELD OF THE INVENTION

The present invention relates steganography and more particularly to the digital watermarks.

BACKGROUND AND SUMMARY OF THE INVENTION

The technology for applying digital watermarks to images and to other types of data is well developed. For example see issued U.S. Pat. No. 5,748,783, issued U.S. Pat. No. 5,768, 426 issued U.S. Pat. No. 5,822,435 and the references cited in these patents. Also various commercially available products (such as the widely used image editing program Photoshop™ marketed by Adobe Corporation) have image watermarking capability. There are many other patents and much technical literature available relating to the application of digital watermarks to images and to other types of data.

Co-pending application Ser. No. 09/553,084 describes a technique of color adaptive watermarking. With the technique described in application Ser. No. 09/553,084 a change in an image attribute such as luminance (or chrominance) is mapped to a change in color components such that the change is less visible application Ser. No. 09/553,084 describes the "scale to black" and the "scale to white" techniques for applying watermarks. By using the scale to white method for colors with a high yellow content such as yellow, red and green, and by using the scale to black for blue, cyan and magenta a watermark with a lower visibility and the same detect ability can be embedded in an image.

It is known that when an image is printed on a standard offset press, the relationship between the digital value of a color and the amount of ink actually applied by the press is not linear. FIG. 1 illustrates the dot gain curve for a typical standard offset printing press. The horizontal axis gives a digital value of a color and the vertical axis indicates the amount of ink actually transferred by the press. The shape of the dot gain curve of offset printing presses is well known.

As a result of the dot gain curve illustrated in FIG. 1, when an image containing a watermark is printed on an offset press, a watermark signal in the shadows (i.e. in an area with more ink) is reduced and a watermark signal in the highlights (i.e. in an area with less ink) is amplified. Note that the slope of the dot gain curve is different in the shadow area and in the highlight area. Thus, the same amount of change in color value produces a different amount of change in the ink applied in the two different areas. The present invention provides a technique which insures that a watermark signal is preserved in an printed image as accurately as possible not withstanding the fact that the dot gain curve of the printing press is not linear.

With the present invention, the image data is first modified in accordance with the forward dot gain curve of a printing press, next the watermark "tweak" values (i.e. the watermark change values) are calculated for this modified image data. The calculated "tweak" values are then modified in accordance with the backward dot gain curve of the printing press. The modified tweak values are then added to the original image data values to produce a watermarked image. The watermark image is then printed on the printing press. The result is that the "effective" tweak on printed paper is not materially affected by the dot gain curve of the printing press.

BRIEF DESCRIPTION OF FIGURES

FIG. 1A shows a forward dot gain curve.

FIG. 1B shows a backward dot gain curve.

FIG. 2 illustrates scaling to black.

FIG. 3 illustrates scaling to white.

DETAILED DESCRIPTION OF EMBODIMENTS

Figure 4:
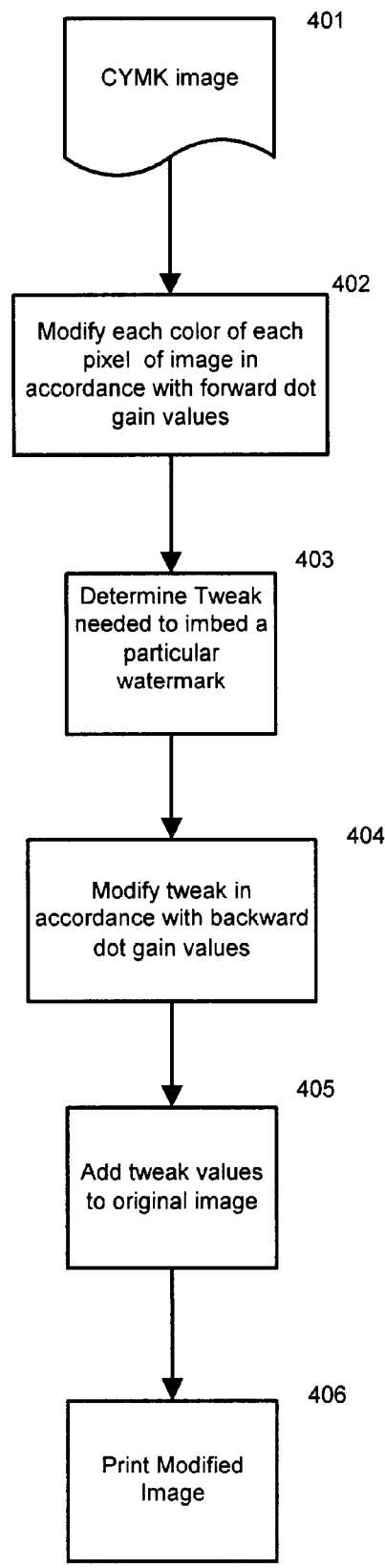
FIG. 4 is a program block flow diagram of the operation of the preferred embodiment.

Co-pending application Ser. No. 09/553,084, filed Apr. 19, 2000 describes a system for watermarking images. The system described in application Ser. No. 09/553,084 inserts watermarks in images by selecting and modifying colors to obtain approximately equal visibility for all colors. The preferred embodiment of present invention, as described herein, is described as a modification of the system described in application Ser. No. 09/553,084. The object of the modifications is to compensate for the dot gain curve of a printer. The entire specification of application Ser. No. 09/553,084 is hereby incorporated herein by reference.

It is desirable that a watermark embedding algorithm produce luminance changes with approximately equal visibility through color space. Adaptive color embedding as described in application Ser. No. 09/553,084, selects the colors that are modified to produce a required luminance change, in a way that obtain approximately equal visibility for all colors. The dot gain correction provided by the preferred embodiment described herein approximately compensates for the non-linear effect of the printing process, so that a desired percentage change is achieved on press (that is, in the amount of ink applied to create the image). It is noted that the slope of the dot gain curve is different in the shadow area and in the highlight area. Thus, the same amount of change in color value produces a different amount of change in the ink applied in the two different areas. The preferred embodiment insures that a watermark signal (i.e. a change value) is preserved in a printed image as accurately as possible not withstanding the fact that the dot gain curve of the printing press is not linear.

As explained in application Ser. No. 09/553,084 a watermark can be applied to images using either a scale to black or a using a scale to white technique. With the scale to black technique, the image pixel is like a vector between black and the pixel color value. The vector is increased or decreased as shown in FIG. 2. That is, FIG. 2 illustrates the color changes for a luminance change utilizing the scale to black technique. The following table lists for each color, the colors that are modified as a result of a luminance change. The table also indicates the degree to which the modification is visible.

| For Scale to Black: | | |
|---|---|---|
| Color | Colors Modified | Visibility of the change |
| yellow | cyan/magenta | high |
| red | cyan | high |
| green | magenta | medium |

-continued

For Scale to Black:

| Color | Colors Modified | Visibility of the change |
|---|---|---|
| Blue | Yellow | low |
| Cyan | Magenta/yellow | low |
| Magenta | Cyan/yellow | low |

FIG. 3 illustrates the color changes that occur with a scale to white technique. The scale to white technique obtains the same luminance change as the scale to black technique; however, when scaling to white the image pixel is a vector between white and the pixel color value as shown in FIG. 2. The following table lists for each color, the colors modified as the result of a luminance change. The table also indicates the degree to which the modification is visible.

For Scale to White

| Color | Colors Modified | Visibility of change |
|---|---|---|
| yellow | yellow | low |
| red | magenta/yellow | low |
| green | cyan/yellow | medium |
| Blue | Cyan/magenta | high |

-continued

For Scale to White

| Color | Colors Modified | Visibility of change |
|---|---|---|
| Cyan | Cyan | high |
| Magenta | Magenta | medium |

By using the scale to white method for colors with high yellow content such as yellow and red, and scale to black for blue, cyan, magenta and green a lower visibility mark can be made with the same detectability. Scaling to white results in the watermark being applied mainly to the dominant colors, and scaling to black implies that the watermark is mainly in the secondary colors.

When images are printed on an offset press, it is known that there is not a straight line relationship between the digital value of the color at any point in the image and the corresponding amount of ink applied to the paper at that point. This is known as dot gain. FIG. 1A shows the forward dot gain curve. That is the relationship between the digital value of a color and the amount of ink actually applied. FIG. 2B shows a backward dot gain curve. That is, FIG. 2 indicates the value needed in order to get a particular amount of ink on the paper.

The following is a list of 256 values that generate a curve as shown in FIG. 1A. That is, the following is a list of 256 positions on the vertical axis for 256 positions (i.e. for 0 to 255) on the horizontal axis.

| | | | | | | | | | | | |
|---|---|---|---|---|---|---|---|---|---|---|---|
| 0 | 7 | 12 | 18 | 22 | 26 | 29 | 32 | 34 | 37 | 39 | 42 |
| 44 | 46 | 48 | 50 | 52 | 54 | 55 | 57 | 59 | 60 | 62 | 64 |
| 65 | 67 | 68 | 70 | 71 | 73 | 74 | 76 | 77 | 78 | 80 | 81 |
| 83 | 84 | 85 | 86 | 88 | 89 | 90 | 91 | 93 | 94 | 95 | 96 |
| 97 | 99 | 100 | 101 | 102 | 103 | 104 | 105 | 106 | 108 | 109 | |
| 110 | 111 | 112 | 113 | 114 | 115 | 116 | 117 | 118 | 119 | 120 | |
| 121 | 122 | 123 | 124 | 125 | 126 | 127 | 128 | 129 | 130 | 131 | |
| 132 | 133 | 134 | 135 | 135 | 136 | 137 | 138 | 139 | 140 | 141 | |
| 142 | 143 | 144 | 144 | 145 | 146 | 147 | 148 | 149 | 150 | 150 | |
| 151 | 152 | 153 | 154 | 155 | 155 | 156 | 157 | 158 | 159 | 160 | |
| 160 | 161 | 162 | 163 | 164 | 164 | 165 | 166 | 167 | 168 | 168 | |
| 169 | 170 | 171 | 171 | 172 | 173 | 174 | 175 | 175 | 176 | 177 | |
| 178 | 178 | 179 | 180 | 181 | 181 | 182 | 183 | 184 | 184 | 185 | |
| 186 | 186 | 187 | 188 | 189 | 189 | 190 | 191 | 191 | 192 | 193 | |
| 194 | 194 | 195 | 196 | 196 | 197 | 198 | 198 | 199 | 200 | 201 | |
| 201 | 202 | 203 | 203 | 204 | 205 | 205 | 206 | 207 | 207 | 208 | |
| 209 | 209 | 210 | 211 | 211 | 212 | 213 | 213 | 214 | 215 | 215 | |
| 216 | 216 | 217 | 218 | 218 | 219 | 220 | 220 | 221 | 222 | 222 | |
| 223 | 224 | 224 | 225 | 225 | 226 | 227 | 227 | 228 | 229 | 229 | |
| 230 | 230 | 231 | 232 | 232 | 233 | 234 | 234 | 235 | 235 | 236 | |
| 237 | 237 | 238 | 238 | 239 | 240 | 240 | 241 | 241 | 242 | 243 | |
| 243 | 244 | 244 | 245 | 246 | 246 | 247 | 247 | 248 | 249 | 249 | |
| 250 | 250 | 251 | 251 | 252 | 253 | 253 | 254 | 254 | 255 | | |

The following is a list of 256 values that generate the curve shown in FIG. 1B. That is, the following are the vertical values for 256 positions (i.e. 0 to 255) on the horizontal axis.

| | | | | | | | | | | | |
|---|---|---|---|---|---|---|---|---|---|---|---|
| 0 | 1 | 1 | 1 | 1 | 1 | 1 | 1 | 2 | 2 | 2 | 2 |
| 2 | 3 | 3 | 3 | 3 | 3 | 3 | 4 | 4 | 4 | 4 | 5 |
| 5 | 5 | 5 | 6 | 6 | 6 | 7 | 7 | 7 | 8 | 8 | 9 |
| 9 | 9 | 10 | 10 | 11 | 11 | 11 | 12 | 12 | 13 | 13 | 14 |
| 14 | 15 | 15 | 16 | 16 | 17 | 17 | 18 | 19 | 19 | 20 | 20 |
| 21 | 22 | 22 | 23 | 23 | 24 | 25 | 25 | 26 | 27 | 27 | 28 |
| 29 | 29 | 30 | 31 | 31 | 32 | 33 | 34 | 34 | 35 | 36 | 36 |

-continued

| | | | | | | | | | | | |
|---|---|---|---|---|---|---|---|---|---|---|---|
| 37 | 38 | 39 | 40 | 40 | 41 | 42 | 43 | 44 | 44 | 45 | 46 |
| 47 | 48 | 49 | 49 | 50 | 51 | 52 | 53 | 54 | 55 | 56 | 57 |
| 57 | 58 | 59 | 60 | 61 | 62 | 63 | 64 | 65 | 66 | 67 | 68 |
| 69 | 70 | 71 | 72 | 73 | 74 | 75 | 76 | 77 | 78 | 79 | 80 |
| 81 | 82 | 83 | 84 | 86 | 87 | 88 | 89 | 90 | 91 | 92 | 93 |
| 94 | 96 | 97 | 98 | 99 | 100 | 101 | 103 | 104 | 105 | 106 | |
| 107 | 109 | 110 | 111 | 112 | 113 | 115 | 116 | 117 | 118 | 120 | |
| 121 | 122 | 123 | 125 | 126 | 127 | 129 | 130 | 131 | 132 | 134 | |
| 135 | 136 | 138 | 139 | 140 | 142 | 143 | 144 | 146 | 147 | 149 | |
| 150 | 151 | 153 | 154 | 156 | 157 | 158 | 160 | 161 | 163 | 164 | |
| 166 | 167 | 168 | 170 | 171 | 173 | 174 | 176 | 177 | 179 | 180 | |
| 182 | 183 | 185 | 186 | 188 | 189 | 191 | 193 | 194 | 196 | 197 | |
| 199 | 200 | 202 | 203 | 205 | 207 | 208 | 210 | 211 | 213 | 215 | |
| 216 | 218 | 219 | 221 | 223 | 224 | 226 | 228 | 229 | 231 | 233 | |
| 234 | 236 | 238 | 239 | 241 | 243 | 244 | 246 | 248 | 250 | 251 | |
| 253 | 255 | | | | | | | | | | |

It is noted that different offset processes produce different amounts of dot gain; however, with most offset processes, the dot gain curve has the shape shown. For some particular offset processes, the actual values may to 50 or 75 percent of the values given above. The values used in any particular application should be the values appropriate for the particular printing process that will be used to print a particular image.

FIG. 4 is a block program flow diagram of a program for the preferred embodiment of the invention. The process begins with an image 401 which is in the CYMK color space. As indicated by block 402, the values for each color in the image are first modified in accordance with the values of the forward dot gain curve. This generates a modified image.

Next as indicated by block 403 calculations are made using the modified image to determine the "tweak" (i.e. the change) values needed to embed a particular watermark in the modified image. This calculation can be done using known watermarking techniques. In the preferred embodiment, the tweak values are calculated using the technique available in the commercially available Photoshop image editing program. However, in other embodiments, other watermarking techniques can be used.

The tweak values are next modified in accordance with the backward dot gain curve values as indicated by block 404. Next as indicated by block 405, the modified tweak values are added to the values in the original image 401, thereby producing a watermarked image. Finally as indicated by block 406 the watermarked image is printed using an offset press which has the forward and backward dot gain values used in blocks 402 and 404.

The watermark can then be read from the printed image using known watermarks reading techniques.

In an alternate embodiment of the invention, the tweak values are added to the modified image values and then the resultant image is modified in accordance with the backward dot gain curve values; however, it has been found that in most instances, the process described in FIG. 4 eliminates some rounding errors.

In some applications, it has been found desirable to add back a constant that controls the amount of the scale to black signal when a color with high yellow-blue saturation is being embedded. This is sometime necessary, since some cameras are insensitive in the blue channel, so changes in yellow are not detected very well.

In general to dot gain correction is only applied to the CMY channels, and not to K channel. However, if desired the dot gain correction can be applied to all the channels.

The preferred embodiments described above relate to the dot gain curve for offset printing processes. It is noted that other processes such as ink jet printing have a different type of dot gain curve. The invention can be applied to most types of printing processes by merely using a dot gain curve appropriate to the particular process.

Images watermarked using the embodiments described above can be read with conventional watermark reading techniques. Naturally as is conventional the watermark reading technique used should coincide with the particular technique used to generate the change values, that is, with the technique used to watermark the image.

While the invention has been described with respect to watermarking images it should be understood that the principle is applicable to other types of data.

The preferred embodiment relates to an image in the CYMK color space. Other embodiments using the same principles can operate on images in various other color spaces.

While the invention has been shown and described with respect to preferred embodiments, it should be understood that various changes in form and detail may be make without departing from the spirit and scope to the invention. The scope of the invention is limited only by the appended claims.

I claim:

1. A method of watermarking an image comprising the steps of modifying said image in accordance with the values in a forward dot gain curve, calculating change values necessary to watermark said modified image, modifying said change values in accordance with a backward dot gain curve, and combining said modified dot gain values and said image to produce a watermarked image.

2. The method recited in claim 1 wherein said dot gain curve is the dot gain curve associated with an offset printing press.

3. The method recited in claim 1 wherein said backward dot gain curve is the inverse of said forward dot gain curve.

4. The method recited in claim 1 wherein said image includes CYMK (cyan yellow, magenta, and black) colors.

5. The method of claim 1 wherein said image is watermarked using the scale to black technique.

6. The method recited in claim 1 wherein said image is watermarked using the scale to white technique.

7. A system for watermarking an image comprising, means for modifying said image in accordance with a forward dot gain curve, means for generating change values needed to watermark said modified image with a particular watermark, means for calculating change values necessary to watermark said modified image, means for modifying said change values in accordance with a backward dot gain curve, and means for combining said modified dot gain values and said image to produce a watermarked image.

8. The system recited in claim 7 wherein said dot gain curve is the dot gain curve associated with an offset printing press.

9. The system recited in claim 7 wherein said backward dot gain curve is the inverse of said forward dot gain curve.

10. The system recited in claim 7 wherein said image includes CYMK (cyan yellow, magenta, and black) colors.

11. A method of watermarking an image which will be printed on an offset printing press comprising the steps of modifying said image in accordance with the values a forward dot gain curve applicable to said offset printing press, calculating change the values necessary to watermark said modified image with a particular watermark, modifying said change values in accordance with the backward dot gain curve of said offset printing press, combining said modified dot gain values and said image to produce a watermarked image, and printing said watermarked image on said offset press.

12. A method of processing an image comprising the steps of modifying said image in accordance with the values in a forward dot gain curve, calculating change values necessary to watermark said modified image with a particular watermark, modifying said change values in accordance with a backward dot gain curve, combining said modified dot gain values and said image to produce a watermarked image, printing said watermarked image, and reading the watermark in said printed image.

13. The method recited in claim 12 wherein said image is printed on an offset press.

14. The method recited in claim 13 wherein said dot gain curves are the dot gain curves of said offset press.

15. A method of watermarking an image with a particular watermark prior to printing by an offset press comprising the steps of, calculating changes values needed to embed said particular watermark in said image, changing the color values of said image by an amount which results in changes in ink value equal to said changes values, said amount including compensation for a variation in a relationship of an input color value and ink provided by said offset press to represent said in put color values, whereby said image is watermarked with said particular watermark when printed on said offset press.

* * * * *

UNITED STATES PATENT AND TRADEMARK OFFICE
CERTIFICATE OF CORRECTION

PATENT NO. : 6,700,995 B2
APPLICATION NO. : 10/209053
DATED : March 2, 2004
INVENTOR(S) : Alastair M. Reed It is certified that error appears in the above-identified patent and that said Letters Patent is hereby corrected as shown below:

Title Page, item (63), change "Continuation of application No. 09/553,084," to

--Continuation-in-part of application No. 09/553,084--.

Column 1, line 10, change "relates steganography" to --relates to steganography--.

Column 1, line 18, change "426 issued U.S." to --426, issued U.S.--.

Column 1, line 35, "change and magenta a" to --change and magenta, a--.

Column 1, line 56, change "in an printed image" to --in a printed image--.

Column 2, line 23, change "embodiment of present" to --embodiment of the present--.

Column 2, line 50, change "or a using a" to --or using a--.

Column 5, line 22, change "may to 50" to --may be 50--.

Column 5, line 34, change "Next as indicated" to --Next, as indicated--.

Column 5, line 62, change "is sometime necessary," to --is sometimes necessary--.

Column 6, line 41, change "may be make without" to --may be made without--.

Column 7, line 22, change "the values a" to --the values of a--.

UNITED STATES PATENT AND TRADEMARK OFFICE
CERTIFICATE OF CORRECTION

PATENT NO. : 6,700,995 B2
APPLICATION NO. : 10/209053
DATED : March 2, 2004
INVENTOR(S) : Alastair M. Reed It is certified that error appears in the above-identified patent and that said Letters Patent is hereby corrected as shown below:

Column 8, line 28, change "in put color" to --input color--.

Signed and Sealed this

Fourth Day of September, 2007

JON W. DUDAS
*Director of the United States Patent and Trademark Office*